United States Patent [19]

Hatori

[11] Patent Number: 4,941,722
[45] Date of Patent: Jul. 17, 1990

[54] LIGHT BEAM DEFLECTOR
[75] Inventor: Masami Hatori, Kanagawa, Japan
[73] Assignee: Fuji Photo Film Co., Ltd., Kanagawa, Japan
[21] Appl. No.: 355,519
[22] Filed: May 23, 1989
[30] Foreign Application Priority Data May 27, 1988 [JP] Japan .............................. 63-130015

[51] Int. Cl.⁵ .............................................. G02B 6/10
[52] U.S. Cl. ............................... 350/96.13; 350/96.14
[58] Field of Search ................ 350/96.13, 96.14, 96.15

[56] References Cited

U.S. PATENT DOCUMENTS

| | | | |
|---|---|---|---|
| 3,919,669 | 11/1975 | Hartemann | 350/96.13 |
| 4,425,023 | 1/1984 | Matsumoto et al. | 350/96.13 |
| 4,455,064 | 6/1984 | Kenan | 350/96.13 |
| 4,470,661 | 9/1984 | Matsumoto | 350/96.13 |
| 4,595,253 | 6/1986 | Yamashita et al. | 350/96.13 |
| 4,735,476 | 4/1988 | Heffner et al. | 350/96.13 |
| 4,815,802 | 3/1989 | Nakamura | 350/96.14 X |

FOREIGN PATENT DOCUMENTS

| | | | |
|---|---|---|---|
| 192232 | 10/1984 | Japan | 350/96.13 |
| 183626 | 2/1985 | Japan . | |
| 527973 | 1/1975 | U.S.S.R. | 350/96.14 |

OTHER PUBLICATIONS

IEEE Transactions on Circuits and Systems, vol. CA-S-26, No. 12, C. S. Tsai, "Guided-Wave Acoustooptic Bragg Modulators for Wide-Band Integrated Optic Communications and Signal Processing", Dec. 1979, pp. 1072-1098.

Primary Examiner—Frank Gonzalez
Assistant Examiner—Phan T. Heartney
Attorney, Agent, or Firm—Sughrue, Mion, Zinn, Macpeak & Seas

[57] ABSTRACT

A light beam deflector includes an optical waveguide made of a material capable of propagating surface elastic waves therethrough, and n (n≧2) surface elastic wave generating means for generating in the optical waveguide surface elastic waves which travel across the path of a guided wave traveling in the optical wave guide, thereby diffracting and deflecting the guided wave n times and amplifying the deflection of the guided wave caused by the diffraction thereof. Each of the n surface elastic wave generating means comprises an interdigital transducer having electrode fingers spaced at distances that vary stepwise, and a driver for applying an alternating voltage having a continuously varying high frequency to the interdigital transducer. The drivers apply alternating voltages having frequencies shifted from each other to the interdigital transducers, respectively, so that periodic variations in the intensities of the surface elastic waves generated respectively from the interdigital transducers will not amplify each other.

4 Claims, 5 Drawing Sheets

LIGHT BEAM DEFLECTOR

BACKGROUND OF THE INVENTION

1. Field of the Invention

The present invention relates to a light beam deflector for deflecting a guided light beam in an optical waveguide. A surface elastic wave is generated in the optical waveguide and diffracts the guided light beam. More particularly this invention relates to a light beam deflector in which a light beam is deflected through a wide angle by being deflected a plurality of times with a plurality of surface elastic waves.

2. Description of the Prior Art

There is known a light beam deflector, as disclosed in Japanese Unexamined Patent Publication No. 61(1986)-183626, which comprises an optical waveguide made of a material capable of propagating a surface elastic wave therethrough. A light beam is applied to the optical waveguide and propagated therethrough as a guided wave. A surface elastic wave is produced in the optical waveguide and directed across the guided wave, and the guided wave is diffracted by the surface elastic wave through Bragg diffraction. In order continuously to vary the angle of diffraction (i.e. the angle of deflection) of the guided wave, the frequency of the surface elastic wave is continuously varied. A light beam deflector of this type is advantageous over a mechanical light beam deflector such as a galvanometer mirror or polygon mirror, an electrooptic deflector (EOD), and an acoustooptic deflector (AOD), since it may be small in size, light in weight and highly reliable as it has no mechanical movable parts.

However, a light beam deflector employing an optical waveguide has a problem in that it cannot achieve a large angle of deflection. More specifically, since the light beam deflecting angle is substantially proportional to the frequency of the surface elastic wave, if a large angle of deflection is to be obtained, then the frequency of the surface elastic wave has necessarily has to be increased to a very high value. Therefore, the frequency of the surface elastic wave would have to vary over a wide range. In addition, to meet the conditions for Bragg diffraction, the direction of travel of the surface elastic wave would have to be continuously steered to control the angle of incidence of the guided wave on the surface elastic wave.

To meet the above requirements, there has been proposed a light beam deflector as also disclosed in Japanese Unexamined Patent Publication No. 61(1986)-183626, which has a plurality of interdigital transducers (IDT) for generating respective surface elastic waves with frequencies which vary over different ranges. The IDTs are oriented such that they emit the surface elastic waves in different directions, and they are alternately switched into and out of operation.

This light beam deflector has a problem in that since the diffraction efficiency is lowered around the crossover frequency of the surface elastic waves generated by the IDTs, the intensity of the deflected light beam depends on the angle of deflection.

An IDT which deflects the light beam through a large angle must be arranged so as to be capable of producing a surface elastic wave of a very high frequency. This will be described below with reference to an example. If it is assumed that the angle of incidence of the guided wave on the surface elastic wave is $\theta$, then $\delta$, the angle of deflection of the guided wave due to an acoustooptic interaction between the surface elastic wave and the guided wave, is $\delta = 2\theta$, which is expressed as follows:

$$2\theta = 2\sin^{-1}\{\lambda/(2Ne \cdot \Lambda)\} \quad (1)$$
$$\simeq \lambda/(Ne \cdot \Lambda)$$
$$= \lambda \cdot f/(Ne \cdot v)$$

where $\lambda$ is the wavelength of the guided wave, Ne is the effective refractive index of the optical waveguide with respect to the guided wave, and $\Lambda$, f, v are the wavelength, frequency, and speed, respectively, of the surface elastic wave. Therefore, the deflection angle range $\Delta(2\theta)$ becomes:

$$\Delta(2\theta) = \Delta f \cdot \lambda / Ne \cdot v$$

If a deflection angle range $\Delta(2\theta) = 10°$ is to be obtained with $\lambda = 0.78$ μm, Ne = 2.2, and v = 3500 m/s, for example, then the frequency range of the surface elastic wave, i.e., the range of high frequencies to be applied to the IDT must vary by $\Delta f = 1.72$ GHz. If this frequency range is selected to be 1 octave so as not to be affected by secondary diffracted light, then the central frequency is $f_0 = 2.57$ GHz, and the maximum frequency is $f_2 = 3.43$ GHz. The wavelength $\Lambda$ of the surface elastic wave which is produced by the IDT and has the maximum frequency $f_2$ becomes $\Lambda = 1.02$ μm, and the line width W of the electrode fingers of the IDT becomes $W = \Lambda/4 = 0.255$ μm.

With the conventional photolithographic and electron beam printing processes used for fabricating IDTs, the limits for the line widths at present are 0.8 μm and 0.5 μm, respectively. It is therefore impossible to fabricate an IDT having very small line widths as described above. Even if such a finely fabricated IDT could be produced in the future, it would be difficult and highly expensive to produce a driver for generating a frequency as high as 3.43 GHz, and it would be difficult to apply a high voltage to such an IDT. Moreover, if the frequency of the surface elastic wave is increased, as described above, the wavelength thereof is reduced, and hence the surface elastic wave is absorbed to a greater extent by the optical waveguide, resulting in a reduction in the diffraction efficiency.

IEEE Transactions on Circuits and Systems, vol. CAS-26, No. 12, p. 1072 [Guided-Wave Acoustooptic Bragg Modulators for Wide-Band Integrated Optic Communications and Signal Processing] by C. S. TSAI, does not disclose a light beam deflector in which a plurality of IDTs are switched into and out of operation, but does disclose a single IDT constructed as an IDT having arcuate electrode fingers, each having a continuously varying line width, which causes the frequency and the direction of travel of a surface elastic wave to vary continuously over a wide range. The disclosed arrangement eliminates the aforesaid problem of variation in the intensity of a light beam, which variation depends on the angle of deflection of the light beam, but still requires the surface elastic wave to have a high frequency.

The applicant has proposed a light beam deflector which can deflect a light beam through a wide angle and in which the intensity of the light beam does not vary and the frequency of a surface elastic wave is not set to a high value (see U.S. patent application No. 127,020).

The proposed light beam deflector, in which surface elastic waves diffract and deflect a guided wave traveling through an optical waveguide which is made of a material capable of propagating the surface elastic waves therethrough, includes:

first surface elastic wave generating means for generating in the optical waveguide a first surface elastic wave which travels across the light path of the guided wave and diffracts and deflects the first guided wave traveling along the light path; and second surface elastic wave generating means for generating in the optical waveguide a second surface elastic wave which travels across the light path of the diffracted guided wave and diffracts and deflects the guided wave in a direction which amplifies the deflection thereof caused by the diffraction, the first and second surface elastic wave generating means being arranged so as to continuously vary the frequencies and directions of the first and second surface elastic waves while meeting the conditions:

$$lk_1 + lK_1 = lk_2$$

$$lk_2 + lK_2 = lk_3$$

wherein $lk_1$ is the wave vector of the guided wave before it is diffracted by the first surface elastic wave, $lk_2$ is the wave vector of the guided wave after it is diffracted by the first surface elastic wave, $lk_3$ is the wave vector of the guided wave diffracted by the second surface elastic wave, and $lk_1$, $lk_2$ are the wave vectors of the first and second surface elastic waves.

Each of the first and second surface elastic wave generating means comprises a tilted-finger chirped interdigital transducer having electrode fingers spaced at distances or intervals which vary stepwise and oriented in directions which vary stepwise, and a driver for applying an alternating voltage having a continuously varying frequency to the tilted-finger chirped interdigital transducer.

Since the guided wave deflected by the first surface elastic wave is deflected again by the second surface elastic wave, the light beam deflector can provide a total deflection angle range which is wide even if each of the first and second surface elastic waves does not have a wide frequency range.

Three or more surface elastic waves may be propagated in a single optical waveguide so that a guided wave will be diffracted and deflected three or more times. According to such a modification, all of two adjacent surface elastic waves will diffract and deflect the guided wave and should be generated in the same manner as the first and second surface elastic waves referred to above. Thus, the guided wave can be deflected through a wider angle than if it is diffracted twice.

Generally, an IDT of the type described above and a driver (which comprises a high-frequency amplifier and a frequency sweeper) for applying an alternating voltage having a swept frequency to the IDT are employed as a means for generating a surface elastic wave. It is recognized that the generated surface elastic wave is subject to periodic intensity variations or fluctuations. More specifically, since the IDT and high-frequency amplifier are designed for use in a high-frequency range, their impedance is widely different from the impedance (i.e., of 50 Ω) of ordinary high-frequency systems. Because of their differing impedances, a large reflection is caused between a high-frequency cable and the IDT, and a reflected wave is sent back to the high-frequency amplifier. Inasmuch as the high-frequency amplifier is also designed for use in a high-frequency range, as described above, it reflects a wave having a power of several percent to several tens of percent of the power of the high-frequency wave, which propagates again toward the IDT. The reflected wave directed toward the IDT and a high-frequency wave (traveling wave) which is produced by the high-frequency amplifier interfere with each other, thereby varying the intensity of the high-frequency wave. Because the high-frequency cable has a constant length, the intensity of the high-frequency wave periodically cycles between high and low values as the frequency is swept in the high-frequency range.

When the intensity of the high-frequency wave applied to the IDT fluctuates, the intensity of the surface elastic wave generated by the IDT also varies, with the consequence that the efficiency with which the guided wave is diffracted by the surface elastic wave also vacillates. As a result, the quantity of the diffracted light beam, i.e., the intensity of a deflected light beam, varies. When the light beam deflector has a plurality of IDTs, as described above, the variation in the diffraction efficiency is amplified each time the guided wave is diffracted by a surface elastic wave, and the intensity of the deflected light beam tends to fluctuate to a large extent.

SUMMARY OF THE INVENTION

It is an object of the present invention to provide a light beam deflector which will eliminate the aforesaid drawbacks of the conventional light beam deflector.

According to the present invention, a light beam deflector has n IDTs in an optical waveguide for generating respective surface elastic waves which diffract a guided wave successively n times, and drivers for applying, to the respective IDTs, high-frequency alternating voltages having respective different frequencies which are shifted such that periodic variations in the intensities of surface elastic waves generated respectively by the IDTs will not amplify each other.

In order to minimize variations in the intensity of a deflected light beam which are caused by fluctuations in the intensities of the surface elastic waves, the effects of such intensity fluctuations should be canceled out. To meet this requirement, the drivers should be arranged such that, for example, the fluctuations have equal periods, respectively, and that the fluctuations are shifted by about 1/n period (n represents the number of surface elastic waves).

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 4(a1) through 4(c) are diagrams illustrating how the diffraction efficiency is made constant according to the present invention;

DESCRIPTION OF THE PREFERRED EMBODIMENTS

Like or corresponding parts are denoted by like or corresponding reference characters throughout the drawings.

Figure 1:
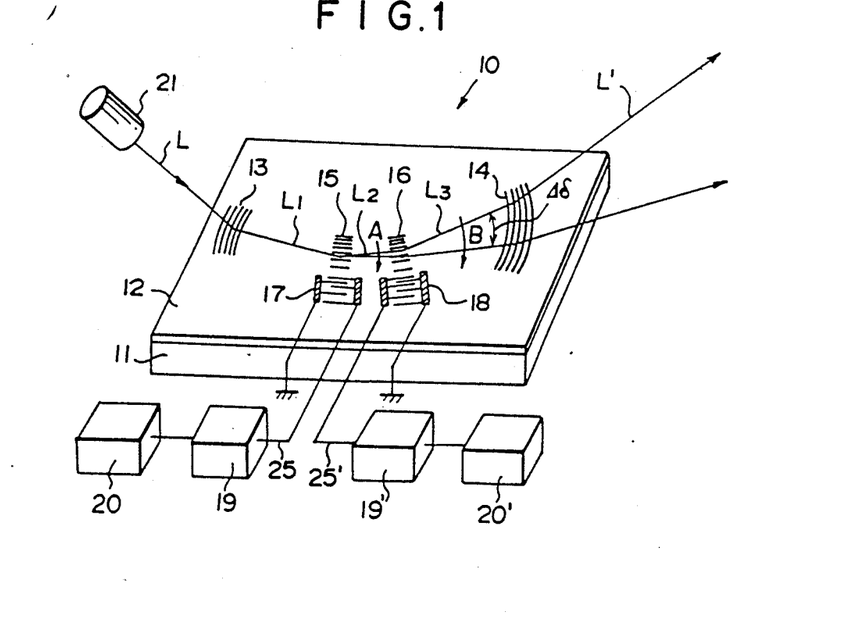
FIG. 1 is a schematic perspective view of a light beam deflector according to an embodiment of the present invention.

FIG. 1 shows a light beam deflector according to an embodiment of the present invention. The light beam deflector, generally designated by the reference numeral 10, comprises an optical waveguide 12 on a substrate 11, a focusing grating coupler (FGC) 13 on the optical waveguide 12 through which a light beam is introduced, another FGC 14 on the optical waveguide 12 from which a light beam is emitted, a pair of first and second tilted-finger chirped interdigital transducers (IDT) 17, 18 on the optical waveguide 12 for generating surface elastic waves 15, 16, respectively, in directions which cross the paths of guided waves traveling between the FGCs 13, 14, a pair of high-frequency amplifiers 19, 19' for applying high-frequency alternating voltages respectively to the tilted-finger chirped IDTs 17, 18, which generates the surface elastic waves 15, 16, and a pair of sweepers 20, 20' for continuously varying or sweeping the frequencies of the voltages produced by the high-frequency amplifiers 19, 19'.

In this embodiment, the substrate 11 is in the form of a wafer of $LiNbO_3$, for example, and a Ti-diffused film, for example, is provided on the surface of the wafer and forms the optical waveguide 12. However, the substrate 11 may be a crystalline substrate of sapphire, Si, or the like, and the optical waveguide 12 may comprise a film of any of other suitable materials formed by sputtering, evaporation, or the like. Optical waveguides are described in detail in *Integrated Optics* edited by T. Tamir, Topics in Applied physics, vol. 7, published by Springer-Verlag, 1975, and *Optical Integrated Circuits* written by Nishihara, Haruna, and Suhara, and published by Ohm Co., 1985. The optical waveguide 12 of the present invention may be any of the known optical waveguides. However, the optical waveguide 12 should be made of a material such as a Ti-diffused film capable of propagating a surface elastic wave. The optical waveguide 12 may be of a laminated structure of two or more films or layers.

The tilted-finger chirped IDTs 17, 18 may be formed as follows, for example: a positive electron beam resist is coated on the surface of the optical waveguide 12; an electrically conductive thin film of Au is evaporated onto the positive electron beam resist; an electrode pattern is then printed with an electron beam on the thin film of Au; the thin film of Au is peeled off; thereafter the electrode pattern is developed; then thin films of Cr and Al are evaporated on the surface formed thus far and the unnecessary layers are lifted off in an organic solution. If the substrate 11 and the optical waveguide 12 are made of a piezoelectric material, then the tilted-finger chirped IDTs 17, 18 which generate the surface elastic waves 15, 16 may directly be disposed in the optical waveguide 12 or on the substrate 11. If the substrate 11 and the optical waveguide 12 are not made of a piezoelectric material, then a piezoelectric thin film of ZnO, for example, is deposited on a portion of the substrate 11 or the optical waveguide 12 by evaporation, sputtering, or the like, and then the IDTs 17, 18 are formed on the piezoelectric thin film.

A light beam L to be deflected is emitted from a light source 21 such as a semiconductor laser toward the FGC 13. The light beam L (divergent beam) is converged by the FGC 13 into a parallel beam which is then introduced into the optical waveguide 12 and travels as a guided wave $L_1$ in the optical waveguide 12. The guided wave $L_1$ is then diffracted (through Bragg diffraction) into a guided wave $L_2$ due to an acoustooptic interaction between itself and the first surface elastic wave 15 produced by the first tilted-finger chirped IDT 17. The diffracted and deflected guided wave $L_2$ is further diffracted in a direction which amplifies its deflection due to an acoustooptic interaction between itself and the second surface elastic wave 16 produced by the second tilted-finger chirped IDT 18. Since the frequency of the alternating voltage applied to the first tilted-finger chirped IDT 17 varies continuously, as described above, the frequency of the first surface elastic wave 15 also continuously varies. As is apparent from equation (1) above, because the angle through which the guided wave $L_2$ is deflected is substantially proportional to the frequency of the surface elastic wave 15, the guided wave $L_2$ is continuously deflected as indicated by the arrow A because of the varying frequency of the surface elastic wave 15. The guided wave $L_2$ lis then deflected by the second surface elastic wave 16. Inasmuch as the frequency of the second surface elastic wave 16 also varies continuously, a guided wave $L_3$ that has passed through the second surface elastic wave 16 is continuously deflected through a large angle as indicated by the arrow B. The guided wave $L_3$ is then emitted as a light beam L' out of the optical waveguide 12 by the FGC 14, and focused into a spot by the beam converging action of the FGC 14.

Figure 6:
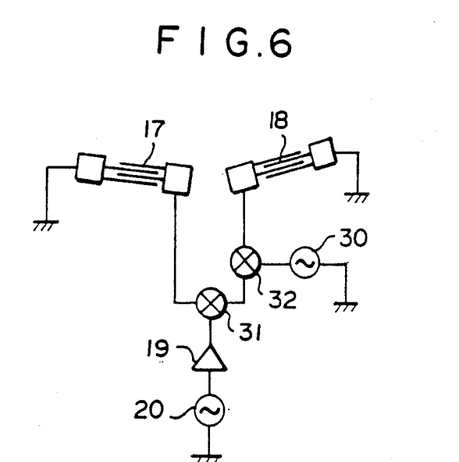

The deflection angle range $\Delta\delta$ of the guided wave $L_3$ will be described with reference to FIG. 2 which shows in detail the configuration and location of the first and second tilted-finger chirped IDTs 17, 18. As shown in FIG. 6, each of the first and second tilted-finger chirped IDTs 17, 18 has electrode fingers spaced at distances or intervals which vary stepwise at a constant rate of change. The directions of orientation of the electrode fingers also vary stepwise at a constant rate of change. The first and second tilted-finger chirped IDTs 17, 18 are arranged such that the ends thereof (upper ends as shown) having shorter distances between the electrode fingers are positioned closer to the guided wave. When the frequency of the applied voltage varies, the first tilted-finger chirped IDT 17 produces a surface elastic wave 15 at a maximum frequency $f_2$ from the upper end thereof and also produces a surface elastic wave 15 at a minimum frequency $f_l$ from the lower end thereof. Likewise, when the frequency of the applied voltage varies, the second tilted-finger chirped IDT 18 produces a surface elastic wave 16 at a maximum frequency $f_2'$ from the upper end thereof and also produces a surface elastic wave 16 at a minimum frequency $f_1'$ from the lower end thereof.

Figure 2:
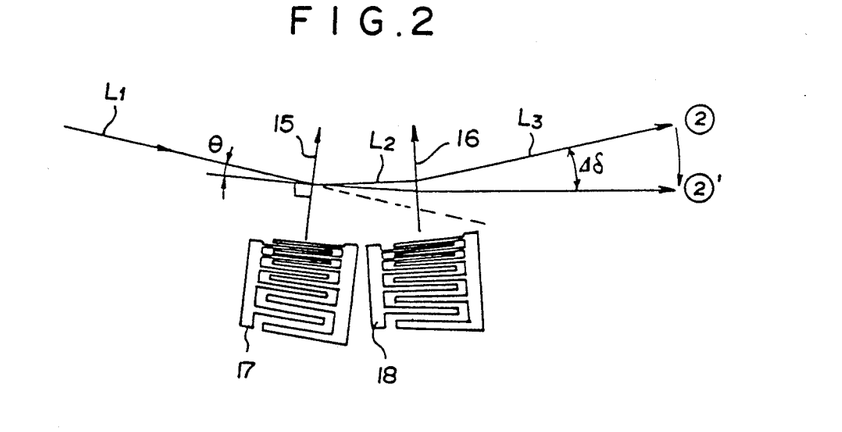
FIG. 2 is a schematic plan view of a portion of the light beam deflector shown in FIG. 1.
Figure 3A:
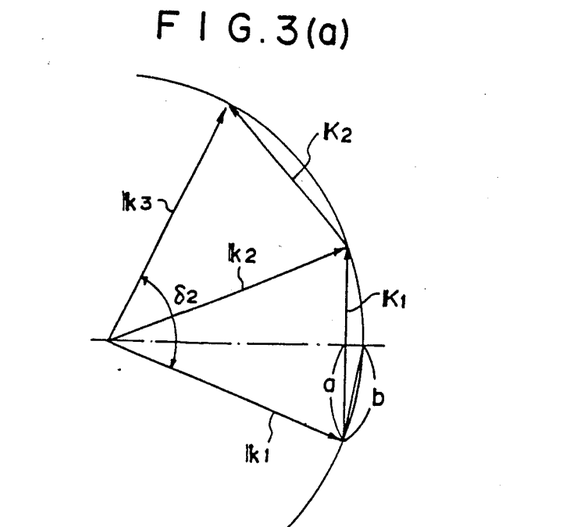
FIGS. 3(a) and 3(b) show the manner in which a light beam is deflected by the light beam deflector shown in FIG. 1.

When the surface elastic waves 15, 16 of the maximum frequencies $f_2l$, $f_2'$ are generated from the first and second tilted-finger chirped IDTs 17, 18, the light beam is diffracted as indicated by (2) in FIG. 2. In this case, the guided wave $L_1$ is applied at an incident angle of $\theta$ to the surface elastic wave 15 having the maximum frequency $f_2$, the incident angle meeting the conditions for Bragg diffraction. More specifically, if it is assumed that the guided wave $L_1$ has a wave vector $lk_2$, the diffracted guided wave $L_2$ a wave vector $lk_2$, and the surface elastic wve 15 a wave vector $lK_2$, then the following relationship is met, as shown in FIG. 3(a):

$$lk_1 + lK_1 = lk_2$$

The direction of travel of the diffracted guided wave $L_2$ is the same as the direction of the vector $lk_2$. At this time, the angle of incidence of the guided wave $L_2$ upon the surface elastic wave 16 having the maximum frequency $f_2'$ is $\theta'$, and meets the Bragg conditions. That is, if it is assumed that the guided wave $L_3$ diffracted by the surface elastic wave 16 has a wave vector $lk_3$ and the surface elastic wave 16 a wave vector $iK_2$, then the following relationship is met, as shown in FIG. 3(a):

$$lk_2 + lK_2 = lk_3$$

The total angle of deflection obtained after the guided wave is diffracted twice is $\delta_2 = 2\theta + 2\theta'$.

The frequencies of the surface elastic waves 15, 16 are gradually lowered to the minimum frequencies $f_1$, $f_1'$. When the frequencies of the surface acoustic waves 15, 16 are $f_1$, $f_1'$, respectively, the wave vectors $lk_1$, $1 lk_2$, $lk_3$, $lK_1$, and $lK_2$ are as indicated in FIG. 3(b) and the above relationships:

$$\left.\begin{array}{l} lk_1 + lK_1 = lk_2 \\ lk_2 + lK_2 = lk_3 \end{array}\right\} \quad (2)$$

are established.

Figure 3B:
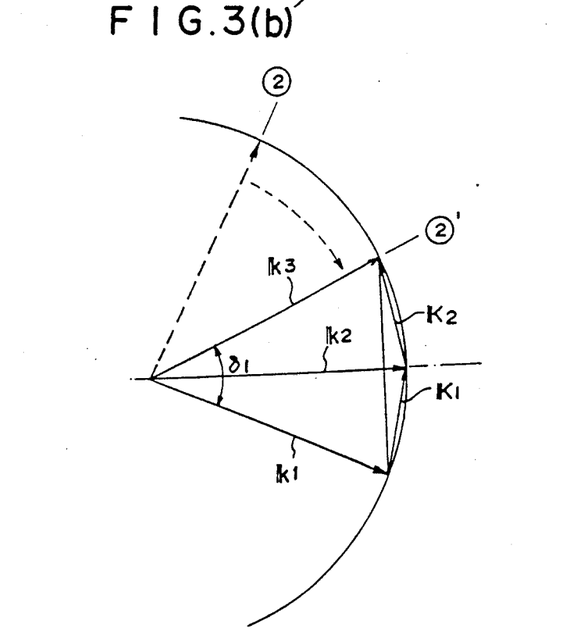

The total angle of deflection obtained after the guided wave is diffracted twice at this time is $\delta_1$ as shown in FIG. 3(b).

While the frequencies of the surface elastic waves 15, 16 are varying from the maximum frequencies $f_2$, $f_2'$ to the minimum frequencies $f_1$, $f_1'$, the above equations (2) and the Bragg conditions for diffraction of the guided wave $L_1$ by the surface elastic wave 15 and the Bragg conditions for diffraction of the guided wave $L_2$ by the surface elastic wave 16 are met at all times.

As can be understood from the above description, when the frequencies of the surface elastic waves 15, 16 are at their maximum and minimum, the directions of travel of the guided wave $L_3$ which has been diffracted twice are the same as the direction of the vector $lk_3$ in FIG. 3(a) and the direction of the vector $lk_3$ in FIG. 3(b), respectively (these vector directions are indicated by (2) and (2)', respectively, in FIG. 2). The difference between these directions is $\Delta\delta = \delta_2 - \delta_1$. If the light beam were deflected by only one surface elastic wave with its maximum frequency $f_2$ being twice its minimum frequency $f_1$, then the deflection angle range would be about $\theta$. Therefore, the value of the difference $\Delta\delta$ can be much larger than the deflection angle range of $\theta$.

Now, the suppression of variations in the intensity of a deflected light beam which are developed by fluctuations in a surface elastic wave will be described below.

It is assumed that each of the high-frequency cables 25, 25' (FIG. 1) extending from the high-frequency amplifiers 19, 19' to the IDTs 17, 18 has a length l, the alternating voltages applied to the IDTs 17, 18 by the high-frequency amplifiers 19, 19' have a frequency f and a wavelength $\lambda_R$, the velocity of light in a vacuum is represented by c, and the cables 25, 25' have a dielectric constant $\epsilon_r$. When the following equation:

$$l = m \frac{\lambda_R}{2\sqrt{\epsilon_r}}$$

(m is the number of standing waves present between the cables) is met, a high-frequency voltage corresponding to the central level of the standing waves is applied to the IDT 17. When the frequency of the voltage varies by $\Delta f$ and the number m of standing waves increases or decreases by 1 (i.e., a change in the number m is $\Delta m = 1$), the high-frequency voltage applied to the IDT 17 is increased or reduced from a level corresponding to the central level of the standing waves and is then returned to that level again, thereby developing a fluctuation during one period. From the above equation and the equations $c = f\lambda_R$ and $\Delta m = 1$, we get $$\Delta f = c/(2l\sqrt{\epsilon_r})$$

Figure 4A:
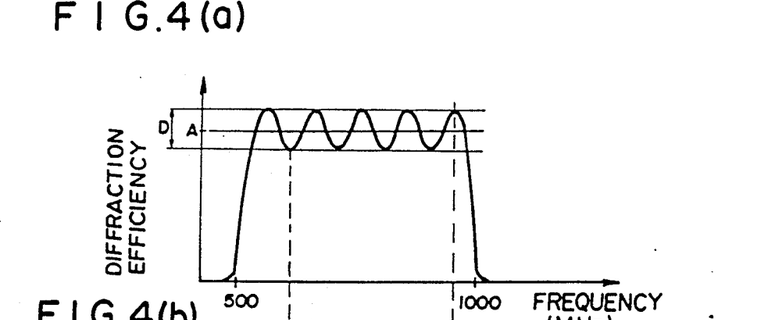
Figure 4B:
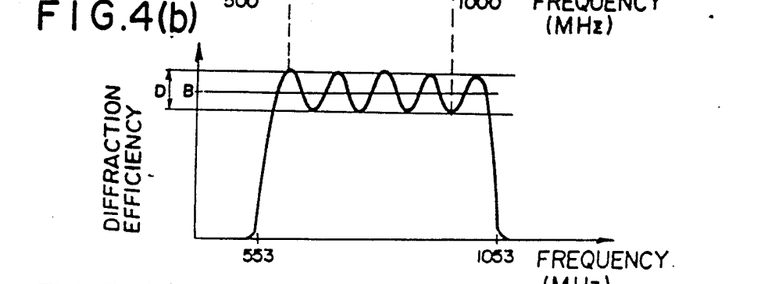
Figure 4C:
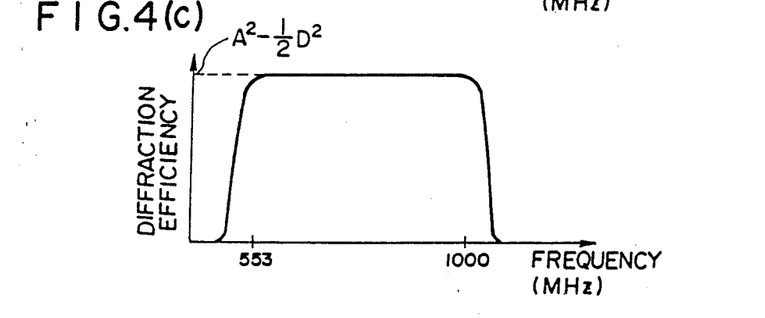

For example, if the cables 25, 25' are each made of Teflon and have a length of 1 meter and a dielectric constant of $\epsilon_r = 2$, then the variation in the frequency becomes $\Delta f = 106$ MHz. Therefore, if the frequencies of the voltages applied to the IDTs 17, 18 are shifted $\Delta f/2 = 53$ MHz from each other at every point in time, the fluctuations (which are of the same period) of the first and second surface elastic waves 15, 16 are shifted by half of the period from each other. According to the present embodiment, the frequency of the voltage applied to the first IDT 17, which frequency is the same as the frequency of the surface elastic wave 15, varies from $f_2 = 1000$ MHz to $f_1 = 500$ MHz, and the frequency of the voltage impressed on the second IDT 18 varies from $f_2' = 1053$ MHz to $f_1' = 553$ MHz. At this time, the fluctuation of the surface elastic wave 15 and the fluctuation of the surface elastic wave 16 are shifted by half of their period from each other at every point in time. The efficiency with which the guided wave is diffracted by the surface elastic waves 15, 16 periodically varies depending on the fluctuations as shown in FIGS. 4(a) and 4(b). However, since the fluctuations of the surface elastic waves 15, 16 are shifted from each other as described above, the combined diffraction efficiency of the surface elastic waves 15, 16 is essentially constant as shown in FIG. 4(c) because the variations in the individual diffraction efficiencies of the surface elastic waves 15, 16 cancel each other out.

Reduction of the fluctuations will specifically be described below. It is assumed, as shown in FIGS. 4(a) and 4(b), that the range D of variations in each of the individual diffraction efficiencies of the surface elastic waves 15, 16 is 20% of the maximum diffraction efficiency, and the diffraction efficiencies at the centers of variation are indicated by A, B (A = B) respectively. The diffraction efficiencies $\eta_A$, $\eta_B$ of the surface elastic waves 15, 16 are given by:

$$\eta_A = A + D\sin x$$
$$\eta_B = B + D\sin(x + \pi)$$
$$= B + (-D)\sin x$$
$$= A - D\sin x$$

where $2\pi$ is the period of the variations. Therefore, the total diffraction efficiency attained after the guided wave is diffracted twice is given by:

$$\eta_A \cdot \eta_B = (A + D\sin x) \times (A - D\sin x)$$
$$= A^2 - D^2\sin^2 x$$
$$= A^2 - D^2 \tfrac{1}{2}(1 - \cos 2x)$$
$$= A^2 - \tfrac{1}{2}D^2 + \tfrac{1}{2}D^2 \cos 2x$$

If the maximum diffraction efficiency is 1, then we obtain

A=0.9, D=0.2, and $D^2 = 0.04$ $A^2 - \tfrac{1}{2}D^2 = 0.79$ $\tfrac{1}{2}D^2 = 0.02$ Therefore, the ratio of the fluctuation $(\tfrac{1}{2})D^2$ to the constant level $(A^2 - (\tfrac{1}{2})D^2)$ is given as follows:

$$\frac{D^2/2}{A^2 - D^2/2} = \frac{0.02}{0.79} = 0.025$$

In this embodiment, therefore, the variations, which are 20% of the diffraction efficiencies of the respective surface elastic waves 15, 16 are reduced to 2.5% after the guided wave is diffracted twice.

Figure 5:
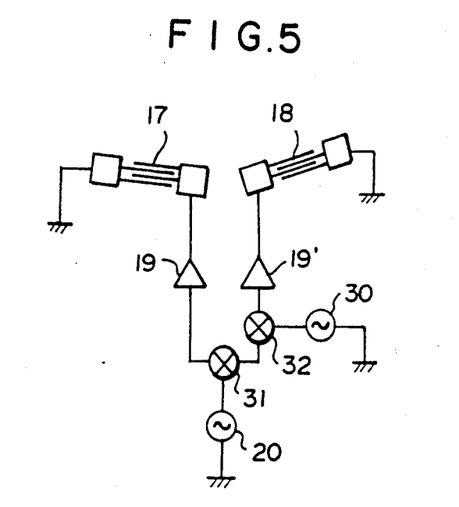
FIGS. 5 and 6 are block diagrams of interdigital transducer drivers according to other embodiments of the present invention.

FIG. 5 shows another embodiment in which an output signal from a single sweeper 20 is divided by a distributor 31 into signals which are applied respectively to high-frequency amplifiers 19, 19' and a local oscillator 30 is connected to the IDT 18. An output signal from the local oscillator 30 is added by a mixer 32 to the output signal from the sweeper 20 which shifts the frequencies of the surface elastic waves generated by the IDTs 17, 18.

According to still another embodiment shown in FIG. 6, a single high-frequency amplifier 19 is shared by the two IDTs 17, 18.

Figure 7:
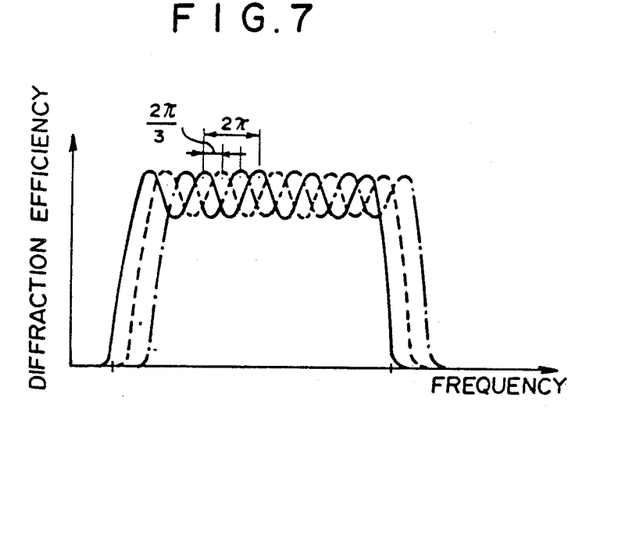
FIG. 7 is a diagram showing how the diffraction efficiency is rendered constant according to the present invention.

The principles of the present invention are also applicable to a light beam deflector in which a guided wave is diffracted three or more times rather than twice. For diffracting a guided wave three times with three surface elastic waves, the frequencies of the surface elastic waves should be selected such that fluctuations of the surface elastic waves will have the same period and will be shifted by $\tfrac{1}{3}$ of their period from each other. Then, the total diffraction efficiency obtained by the three surface elastic waves is made constant as shown in FIG. 7. Details of the diffraction of the guided wave with the three surface elastic waves will be described below. The diffraction efficiencies $\eta_A$, $\eta_B$, $\eta_C$, of the first, second, and third surface elastic waves are expressed by:

$$\eta_A = A + D\sin x$$

$$\eta_B = B + D\sin(x + \tfrac{1}{3}2\pi)$$

$$\eta_C = C + D\sin(x + \tfrac{2}{3}2\pi)$$

where D is the range of variations in each of the diffraction efficiencies, and A, B, C are the diffraction efficiencies at the centers of the variations of the surface elastic waves. The total diffraction efficiency $\eta_3$ obtained when the guided wave is diffracted three times is given by $\eta_3 = \eta_A \cdot \eta_B \cdot \eta_C$. Assuming that A = B = C, the total diffraction efficiency $\eta_3$ is given as follows:

$$\eta_3 = \eta_A \cdot \eta_B \cdot \eta_C$$
$$= A^3 + 0.5 \times 0.5 \times AD^2 \sin^2 x + 0.57 \times 0.87 \times AD^2 \cos^2 x$$

If D=0.2, then we obtain $$\eta_3 = A(A^2 + 0.01 \times \sin^2 x + 0.02 \times \cos^2 x)$$
$$= A\left(A^2 + 0.01\frac{1 - \cos 2\alpha}{2} + 0.02\frac{1 - \cos 2\alpha}{2}\right)$$

If A=0.9, then the total diffraction efficiency becomes:

$\eta_3 = 0.955 (0.81 + 0.005 + 0.01) - 0.015 \cos^2\alpha\}$

Consequently, the ratio of the fluctuation to the constant level $(0.81 + 0.005 + 0.01) = 0.825$ is:

0.015/0.825=0.018

According to this embodiment, therefore, the variations, which are 20% of the diffraction efficiencies of the respective three surface elastic waves, are reduced to 1.8% after the guided wave is diffracted three times.

Generally, when a guided wave is diffracted n times by n surface elastic waves, in order to reduce the fluctuations of the surface elastic waves, the periods of the fluctuations should be made equal, and the frequencies of the surface elastic waves should be shifted such that the fluctuations are shifted by 1/n of their period from each other.

The shifting of the frequencies of the surface elastic waves in the manner described above reduces the fluctuations of the surface elastic waves most efficiently. However, the frequencies of the surface elastic waves may be shifted by amounts which are slightly different from those described above. Even if the frequencies of the surface elastic waves are not shifted exactly by the aforesaid amounts, the total diffraction efficiency is rendered much stabler than if the frequencies of the surface elastic waves were the same and hence variations in the diffraction efficiencies due to the fluctuations of the surface elastic waves were successively amplified.

If a guided wave is diffracted four times with four surface elastic waves, the frequencies of the first and second surface elastic waves may be equalized to each other and the frequencies of the third and fourth surface elastic waves may be equalized to each other, and these frequencies may be selected such that the period of the fluctuations of the first and second surface elastic waves and the period of the fluctuations of the third and fourth surface elastic waves will be shifted from each other by $\tfrac{1}{2}$ of the period.

The tilted-finger chirped IDTs 17, 18 employed in the light beam deflector may be replaced with curved-finger IDTs each having arcuate electrode fingers which are spaced at continuously varying distances or intervals so that the frequencies and directions of travel of the first and second surface elastic waves continuously vary.

With the light beam deflectors of the present invention, the drivers are arranged such that alternating voltages having shifted frequencies are applied to a plurality of IDTs for canceling out variations in the intensities of surface elastic waves generated respectively by the IDTs. Therefore, the total diffraction efficiency of the surface elastic waves is kept at a substantially constant level. Accordingly, variation in the intensity of a deflected light beam is suppressed which allows for highly accurate light beam scanning.

Although certain preferred embodiments have been shown and described, it should be understood that many changes and modifications may be made therein without departing from the scope of the appended claims.

I claim:

1. A light beam deflector comprising:
(i) an optical waveguide made of a material capable of propagating surface elastic waves therethrough;
(ii) n (n≧2) surface elastic wave generating means for generating in said optical waveguide surface elastic waves which travel across the path of a guided wave traveling in said optical wave guide, thereby diffracting and deflecting said guided wave n times and amplifying the deflection of the guided wave caused by the diffraction thereof;
wherein each of said n surface elastic wave generating means comprises an interdigital transducer having electrode fingers spaced at distances that very stepwise, and a driver for applying an alternating voltage having a continuously varying high frequency to said interdigital transducer; and
wherein said drivers have means for applying alternating voltages having frequencies shifted from each other to said interdigital transducers, respectively, so that periodic variations in the intensities of the surface elastic waves generated respectively from said interdigital transducers will not amplify each other.

2. A light beam deflector according to claim 1, wherein said n surface elastic wave generating means are arranged such that the variations in the intensities of the n surface elastic waves have periods substantially equal to each other and are shifted from each other by about 1/n of the periods.

3. A light beam deflector as claimed in claim 1, wherein said interdigital transducer is a tilted-finger chirped interdigital transducer.

4. A light beam deflector as claimed in claim 1, wherein said interdigital transducer is a curved-finger interdigital transducer.

* * * * *